United States Patent
Hong et al.

(10) Patent No.: US 10,534,229 B2
(45) Date of Patent: Jan. 14, 2020

(54) LIQUID CRYSTAL DISPLAY DEVICE AND METHOD OF MANUFACTURING THE SAME

(71) Applicant: Samsung Display Co., Ltd., Yongin-si (KR)

(72) Inventors: Sunghee Hong, Yongin-si (KR); Pilgyu Kang, Yongin-si (KR); Joong Tae Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/342,421

(22) Filed: Nov. 3, 2016

(65) Prior Publication Data

US 2017/0168341 A1  Jun. 15, 2017

(30) Foreign Application Priority Data

Dec. 9, 2015  (KR) .................... 10-2015-0175339

(51) Int. Cl.
  *G02F 1/1339* (2006.01)
  *G02F 1/1341* (2006.01)
  *G02F 1/1343* (2006.01)
  *G02F 1/1362* (2006.01)
  *G02F 1/1368* (2006.01)

(52) U.S. Cl.
  CPC ........ *G02F 1/13394* (2013.01); *G02F 1/1341* (2013.01); *G02F 1/1368* (2013.01); *G02F 1/134309* (2013.01); *G02F 1/136209* (2013.01); *G02F 1/136286* (2013.01); *G02F 2001/13396* (2013.01); *G02F 2001/136222* (2013.01); *G02F 2201/123* (2013.01)

(58) Field of Classification Search
  USPC ......................................................... 349/12
  See application file for complete search history.

(56) References Cited

U.S. PATENT DOCUMENTS

| 2007/0097278 | A1* | 5/2007 | Rho ................... G02F 1/13338 349/12 |
| 2013/0271705 | A1* | 10/2013 | Chen ................ G02F 1/133512 349/106 |
| 2014/0098315 | A1 | 4/2014 | Jung et al. |
| 2016/0062171 | A1* | 3/2016 | Um .................... G02F 1/13394 349/43 |

FOREIGN PATENT DOCUMENTS

| KR | 10-2006-0110665 | 10/2006 |
| KR | 10-2007-0037052 | 4/2007 |
| KR | 10-2013-0030652 | 3/2013 |
| KR | 10-2014-0045014 | 4/2014 |

* cited by examiner

*Primary Examiner* — Joseph L Williams
*Assistant Examiner* — Jacob R Stern
(74) *Attorney, Agent, or Firm* — H.C. Park & Associates, PLC (57) ABSTRACT

A liquid crystal display device (LCD) including a lower substrate divided into a plurality of pixel regions, a liquid crystal layer disposed over the lower substrate, an upper substrate disposed over the liquid crystal layer and facing the lower substrate, a first spacer disposed over the lower substrate and maintaining a cell gap between the lower substrate and the upper substrate, and a second spacer spaced apart from the first spacer and disposed over lower substrate, the second spacer including a lower base region and a projecting region projecting from the lower base region.

20 Claims, 11 Drawing Sheets

LIQUID CRYSTAL DISPLAY DEVICE AND METHOD OF MANUFACTURING THE SAME

CROSS-REFERENCE TO RELATED APPLICATION

This application claims priority from and the benefit of Korean Patent Application No. 10-2015-0175339, filed on Dec. 9, 2015, which is hereby incorporated by reference for all purposes as if fully set forth herein.

BACKGROUND

Field

Exemplary embodiments relate to a liquid crystal display device (LCD) and a method of manufacturing the same.

Discussion of the Background

Recently, various electronic devices, such as a mobile phone, a personal digital assistant (PDA), a computer, a large-screen television (TV), have been developed, causing the demand for a flat panel display device applicable thereto to increase. Among the flat panel display devices, a liquid crystal display device (LCD) has advantages of low power consumption, high-resolution moving picture display, high contrast ratio, etc.

The LCD device includes a liquid crystal (LC) layer disposed between two display substrates, in which an electric field is applied to the LC layer to change the arrangement direction of LC molecules therein, thus changing the polarization direction of incident light. An image is then displayed by associating the change with a polarizer and determining whether to transmit incident light for each pixel.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display device which prevents dot generation by easily restoring deformation due to external pressure, and a method of manufacturing the same.

Additional aspects will be set forth in part in the description which follows and, in part, will be apparent from the description, or may be learned by practice of the inventive concept.

An exemplary embodiment discloses a liquid crystal display device (LCD) including a lower substrate divided into a plurality of pixel regions, a liquid crystal layer disposed over the lower substrate, an upper substrate disposed over the liquid crystal layer and facing the lower substrate, a first spacer disposed over the lower substrate and configured to maintain a cell gap between the lower substrate and the upper substrate, and a second spacer spaced apart from the first spacer and disposed over the lower substrate. The second spacer includes a lower base region and a projecting region projecting therefrom.

An exemplary embodiment also discloses a method of manufacturing an LCD including forming a first spacer and a second spacer spaced apart from the first spacer over a lower substrate that is divided into a plurality of pixel regions, the second spacer including a lower base region and a projecting region over the lower base region and projecting therefrom; arranging the upper substrate to face the lower substrate and bonding the lower substrate to the upper substrate; and forming a liquid crystal layer by injecting a liquid crystal between the upper substrate and the lower substrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
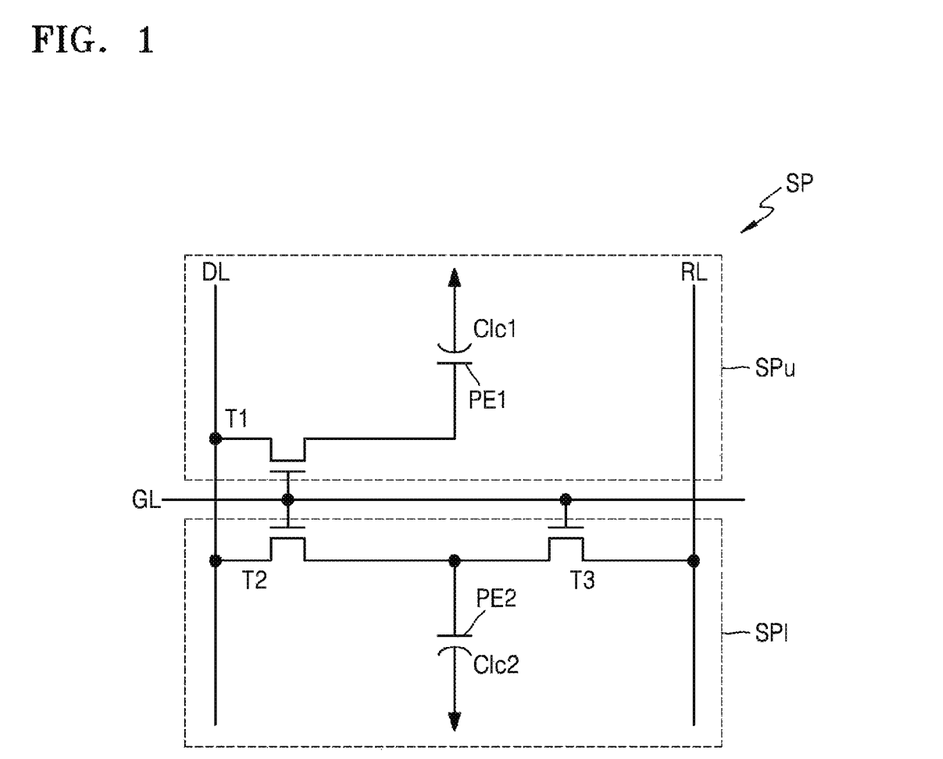
FIG. 1 is an equivalent circuit diagram of a sub-pixel included in a liquid crystal display (LCD) device according to an exemplary embodiment.

FIG. 1 is an equivalent circuit diagram of a sub-pixel included in a liquid crystal display device (LCD) according to an exemplary embodiment.

The LCD may include a plurality of pixels and display an image through the pixels. A "pixel" denotes a minimum unit used in displaying an image. Each of the pixels may include a plurality of sub-pixels, in which the sub-pixels may each emit a different-colored light. Each pixel may realize a prescribed color of light according to a selective combination of the colors produced by the sub-pixels.

Referring to FIG. 1, a sub-pixel SP included in the LCD according to an exemplary embodiment may include a plurality of signal lines including a gate line GL transmitting a gate signal to the sub-pixel, a data line DL transmitting a data signal to the sub-pixel, and a reference voltage line RL transmitting a divided reference voltage to the sub-pixel SP; and first to third transistors T1, T2, T3 that are connected to at least one of the plurality of signal lines, and first and second liquid capacitors Clc1 and Clc2.

The first transistor T1 may include a gate electrode connected to the gate line GL, a source electrode connected to the data line DL, and a drain electrode connected to the first liquid capacitor Clc1. A data signal may be transmitted from the source electrode to the drain electrode when a turn-on signal is applied to the gate electrode. For example, a data voltage may be applied to a first pixel electrode PE1 and a voltage corresponding to a difference between the data voltage and a common voltage may be applied to charge the first liquid capacitor Clc1.

The second transistor T2 may include a gate electrode connected to the gate line GL, a source electrode connected to the data line DL, and a drain electrode connected to the second liquid capacitor Clc2. A data signal may be transmitted from the source electrode to the drain electrode when a turn-on signal is applied to the gate electrode. For example, a data voltage may be applied to a second pixel electrode PE2 and a voltage corresponding to a difference between the data voltage and a common voltage may be applied to charge the second liquid capacitor Clc2. However, the third transistor T3 including a gate electrode connected to the gate line GL may be turned on simultaneously with the second transistor T2, and a voltage applied to charge the second liquid capacitor Clc2 by the third transistor T3, which includes a drain electrode connected to the reference voltage line RL, may have a value less than the difference between the data voltage and the common voltage.

A sub-pixel SP included in the LCD may include an upper sub-pixel region SPu in which the first pixel electrode PE1 is arranged, and a lower sub-pixel region SP1 in which the second pixel electrode PE2 is arranged, and the brightnesses of upper and lower sub-pixel regions SPu and SP1 may change due to a difference of a voltage applied to charge the first liquid capacitor Clc1 included in the upper sub-pixel region SPu and a voltage applied to charge the second liquid capacitor Clc2 included in the lower sub-pixel region SP1. Therefore, the brightnesses and colors of an image emitted in a normal direction and an image emitted in a direction inclined at a prescribed angle with respect to the normal direction may be similar to each other as much as possible by adjusting the difference of the voltage.

According to an exemplary embodiment, the third transistor T3 is used to differentiate brightnesses of the upper sub-pixel region SPu and the lower sub-pixel region SP1, but the inventive concept is not limited thereto and various methods may be used.

Figure 2:
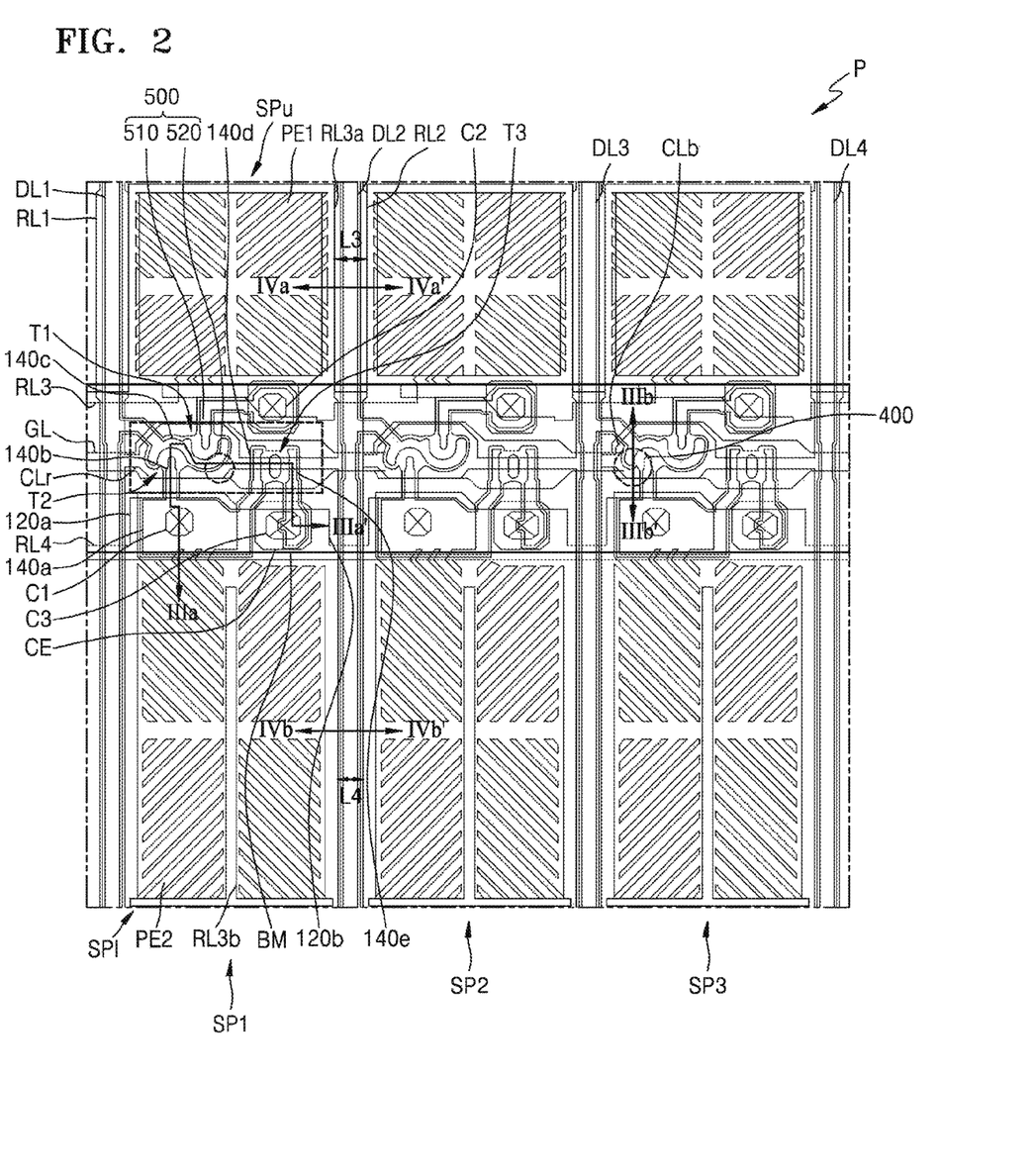
FIG. 2 is a plan view illustrating a pixel included in a LCD according to an exemplary embodiment.
Figure 3:
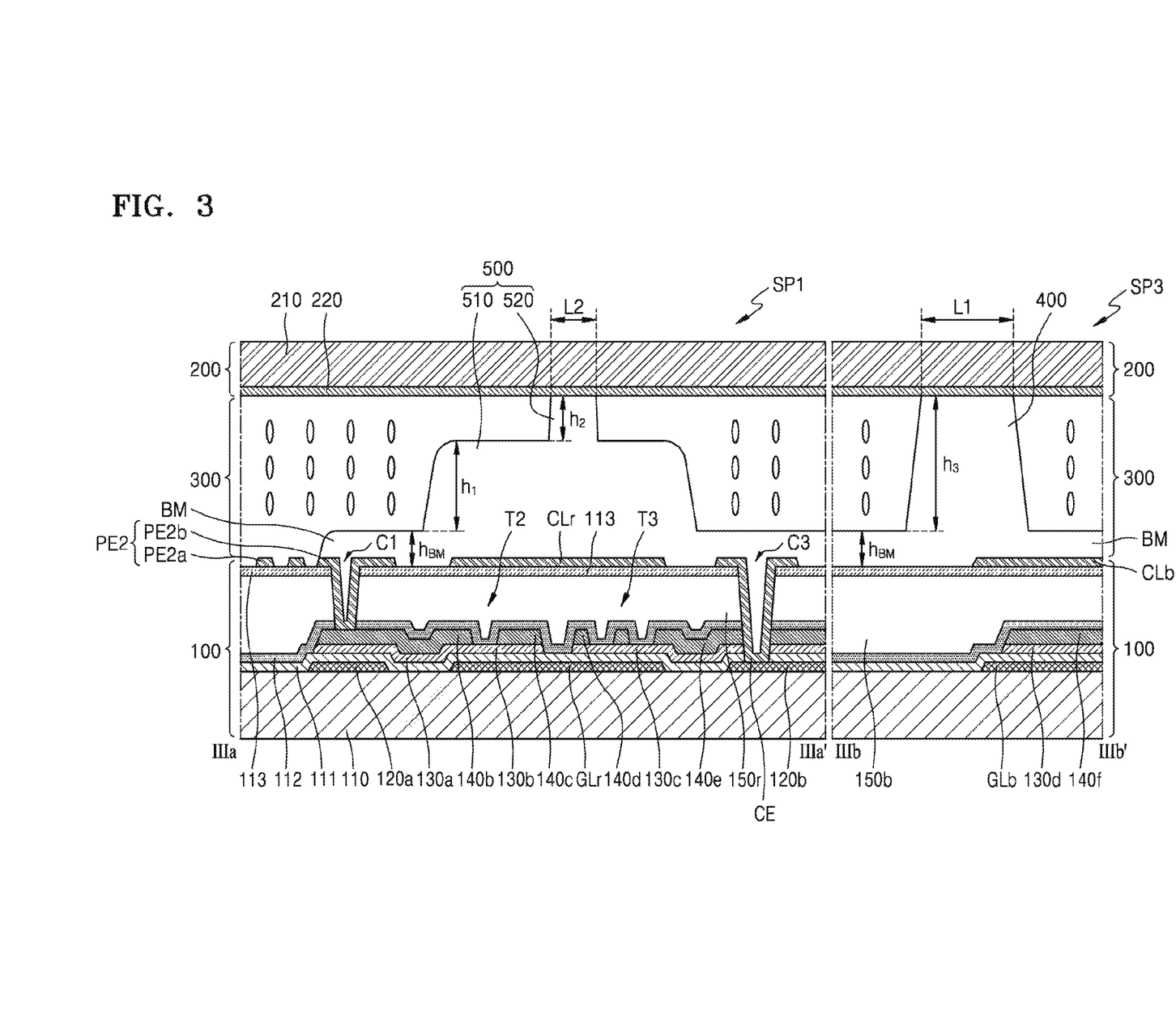
FIG. 3 is a cross-sectional view taken along lines IIIa-IIIa' and IIIb-IIIb' of FIG. 2.
Figure 4A:
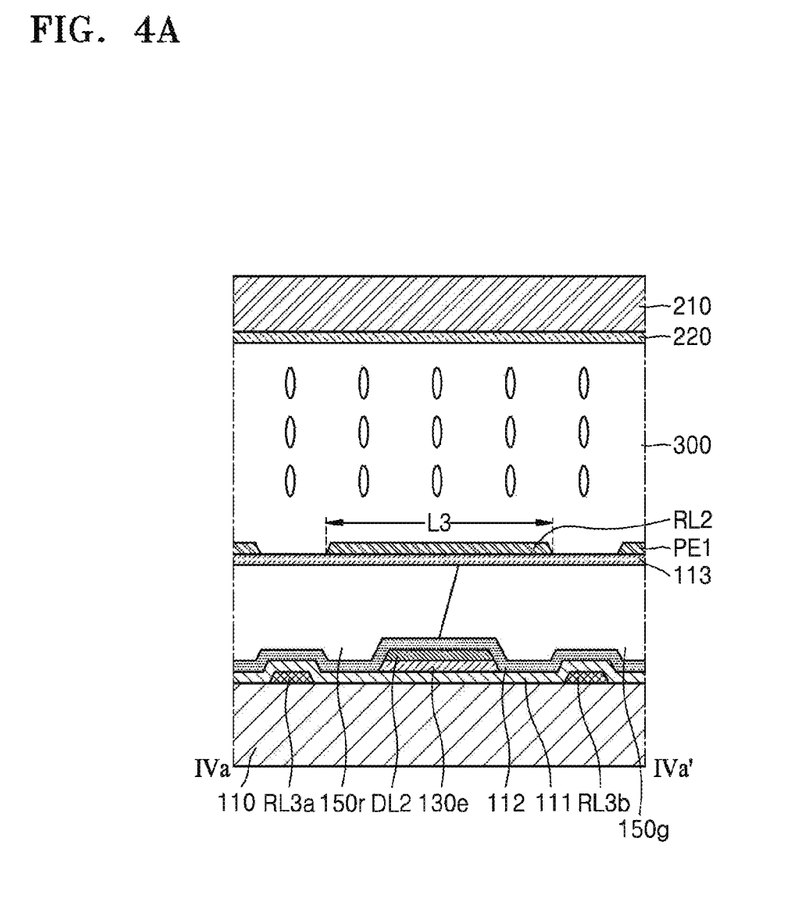
FIGS. 4A and 4B are cross-sectional views taken along lines IVa-Iva' and IVb-IVb' of FIG. 2, respectively.
Figure 4B:
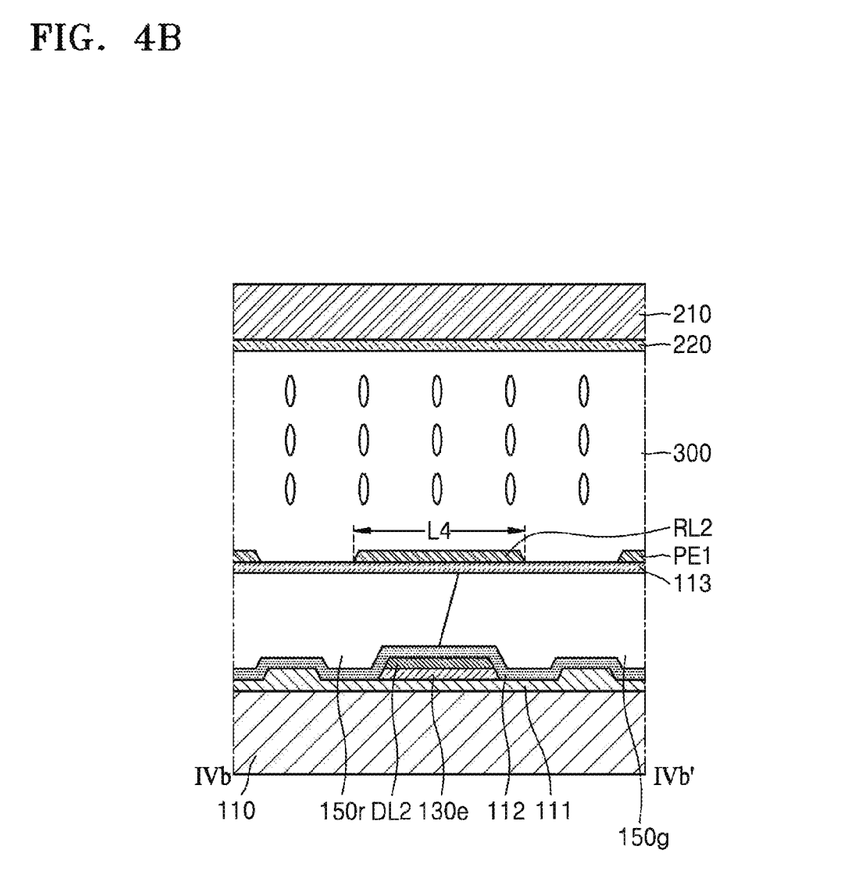

FIG. 2 is a plan view illustrating a pixel P included in an LCD according to an exemplary embodiment, FIG. 3 is a cross-sectional view taken along lines IIIa-IIIa' and Mb-Mb' of FIG. 2, and FIGS. 4A and 4B are cross-sectional views taken along lines IVa-Iva' and IVb-IVb' of FIG. 2, respectively.

Referring to FIGS. 2 and 3, the LCD according to an exemplary embodiment may include a lower substrate 100 divided into a plurality of pixel regions, a liquid crystal layer 300 disposed over the lower substrate 100, an upper substrate 200 disposed over the liquid crystal layer 300 to face the lower substrate 100, a first spacer 400 disposed over the lower substrate 100 and maintaining a cell gap between the lower substrate 100 and the upper substrate 200, and a second spacer 500 spaced apart from the first spacer 400 and disposed over the lower substrate 100 and including a lower base region 510 and a projecting region 520 projecting therefrom.

FIG. 2 illustrates a pixel P including only three sub-pixels, namely, first, second, and third sub-pixels SP1 to SP3. However, an LCD may include a plurality of pixels and display an image by controlling the plurality of pixels according to an exemplary embodiment.

The lower substrate 100 may include a base substrate 110, a gate line GL extending along a first direction over the base substrate 110, and first-to-fourth data lines DL1 to DL4 extending along a second direction crossing the first direction, over the base substrate 110 and spaced apart from each other. The first-to-third data lines DL1 to DL3 may apply data signals to the first-to-third sub-pixels SP1 to SP3, respectively. The fourth data line DL4 may be a line applying a data signal to a sub-pixel included in another pixel adjacent to the pixel P illustrated in FIG. 2. Sub-pixel regions may be defined by the first to fourth data lines DL1 to DL4. According to an exemplary embodiment, the first-to-third sub-pixels SP1 to SP3 may be a red sub-pixel, a green sub-pixel, and a blue sub-pixel, respectively.

According to an exemplary embodiment, the lower substrate 100 may further include first and second reference voltage lines RL1 and RL2 extending along the first and second data lines DL1 and DL2 and facing the same, respectively, wherein the first and second reference voltage lines RL1 and RL2 may be arranged on a layer on which first and second pixel electrodes PE1 and PE2 are also arranged, and may be formed of a same material of the first and second pixel electrodes PE1 and PE2.

The first and second reference voltage lines RL1 and RL2 may be connected to a connection line CLr extending along a direction substantially parallel to the gate line GL. For example, the first and second reference voltage lines RL1 and RL2 are electrically connected to each other, and an identical voltage may be applied thereto.

The first and second reference voltage lines RL1 and RL2 may form a capacitor with first and second data lines DL1 and DL2, respectively. The capacitor may contribute to increasing the capacitances of the first and second liquid capacitors Clc1 and Clc2 of FIG. 1. A voltage applied to the first and second pixel electrodes PE1 and PE2 may change due to a parasitic capacitance, which may be formed by superimposing various conductive layers included in the LCD. In an exemplary embodiment, a decrease in a brightness of an image realized by the LCD or dot generation may be prevented by increasing the capacitances of the first and second liquid capacitors Clc1 and Clc2.

Each of the sub-pixels SP1 to SP3 may include upper and lower sub-pixel regions SPu and SPl, and a driving circuit portion including the gate line GL and first-to-third transistors T1 to T3 may be between the upper sub-pixel region SPu and the lower sub-pixel region SPl. Each of the sub-pixels SP1 to SP3 may include pixel electrodes, wherein the pixel electrodes may include the first pixel electrode PE1 connected to the first transistor T1 and the second pixel electrode PE2 connected to the second transistor T2.

A region, in which the gate line GL and the driving circuit portion is arranged, may be covered by a light shielding film BM. For example, the light shielding film BM may extend along the gate line GL to cover the first-to-third transistors T1 to T3. The light shielding film BM may prevent a decrease in visibility of an LCD due to light incident from outside the LCD and reflected by a metal included in the first-to-third transistors T1 to T3 and the gate line GL.

According to an exemplary embodiment, the LCD may further include light shielding films (not shown) covering the first-to-fourth data lines DL1 to DL4, respectively. The light shielding films may be arranged on a layer on which the light shielding film BM extending along the gate line GL is also arranged, and may be formed of a same material of the light shielding film BM.

According to an exemplary embodiment, the LCD may further include third and fourth reference voltage lines RL3 and RL4 arranged on a layer on which the gate line GL is also arranged, and extending in a direction substantially parallel to the gate line GL, wherein the third and fourth reference voltage lines RL3 and RL4 may be electrically connected to the first and second reference voltage lines RL1 and RL2. The third reference voltage line RL3 may be disposed between the gate line GL and the first pixel electrode PE1, and may include an extended region RL3a surrounding the first pixel electrode PE1. At least a part of the extended region RL3a may superimpose at least a part of the first pixel electrode PE1, and thus, may contribute to increasing the capacitance of the first liquid capacitor Clc1.

According to an exemplary embodiment, the LCD may further include a conductive region RL3b, which is electrically connected to the third and fourth reference voltage lines RL3 and RL4, and superimpose at least a part of the second pixel electrode PE2. Furthermore, capacitors formed by the second pixel electrode PE2 and the conductive region RL3b may contribute to increasing the capacitance of the second liquid capacitor Clc2.

Referring to FIG. 3, a first capacitor electrode 120a, a gate electrode GLr, and a contact voltage line 120b may be disposed over the base substrate 110, wherein the first capacitor electrode 120a and the contact voltage line 120b may be regions of the fourth reference voltage line RL4 and the gate electrode GLr may be a region of the gate line GL. The first capacitor electrode 120a, the gate electrode GLr, and the contact voltage line 120b may be disposed over the same layer and formed of the same material.

A first insulating film 111 may be disposed over the base substrate 110 and cover the first capacitor electrode 120a, the gate electrode GLr, and the contact voltage line 120b, and semiconductor layers 130a, 130b, and 130c may be disposed over the first insulating film 111.

A second capacitor electrode 140a, a drain electrode 140b, and a source electrode 140c of the second transistor T2, and a source electrode 140d and a drain electrode 140e of the third transistor T3 may be disposed over the semiconductor layers 130a, 130b, and 130c. The second capacitor electrode 140a, the drain electrodes 140b and 140e, and the source electrodes 140c and 140d may be disposed over a layer on which the first and second data lines DL1 and DL2 are also arranged, and may be formed of the same material of the first and second data lines DL1 and DL2. The second capacitor electrode 140a may form capacitors with the first capacitor electrode 120a, and may be connected to the drain electrode 140b of the second transistor T2 and the source electrode 140d of the third transistor T3. The source electrode 140c of the second transistor T2 may be connected to the first data line DL1.

An ohmic contact layer (not shown) may further be disposed between the semiconductor layers 130a, 130b, and 130c and the second capacitor electrode 140a; between the semiconductor layers 130a, 130b, and 130c and the drain electrodes 140*b* and 140*e*; and between the semiconductor layers 130*a*, 130*b*, and 130*c* and the source electrodes 140*c* and 140*d*. According to an exemplary embodiment, the semiconductor layers 130*a*, 130*b*, and 130*c* may be formed of amorphous silicon or crystalline silicon, and the ohmic contact layer may be formed of n$^+$ amorphous silicon or crystalline silicon doped with an impurity.

A second insulating film 112 may be disposed over the first insulating film 111 and cover the semiconductor layers 130*a*, 130*b*, and 130*c*, the second capacitor electrode 140*a*, the drain electrodes 140*b* and 140*e*, and the source electrodes 140*c* and 140*d*, and a first color filter 150*r* may be disposed over the second insulating film 112. The first color filter 150*r* may be disposed between the first and second data lines DL1 and DL2, and may cover at least a part of the first and second data lines DL1 and DL2.

The first sub-pixel SP1 defined by the first and second data lines DL1 and DL2 may be a red sub-pixel, and the first color filter 150*r* may be a red color filter only transmitting red light from among incident light or converting incident light into red light.

The second sub-pixel SP2 defined by the second and third data lines DL2 and DL3 may be a green sub-pixel, and a second color filter 150*g* (of FIG. 4A) disposed between the second and third data lines DL2 and DL3 may be a green color filter. The third sub-pixel SP3 defined by the third and fourth data lines DL3 and DL4 may be a blue sub-pixel, and a third color filter 150*b* disposed between the third data line DL3 and fourth data line DL4 may be a blue color filter.

A protective film 113 is disposed over the first color filter 150*r*, and the first and second pixel electrodes PE1 and PE2, the connection line CLr and a contact electrode CE may be disposed over the protective film 113. The second pixel electrode PE2 may include a region PE2*a* having a plurality of slit shapes extending in a prescribed direction, and a region PE2*b* connected to the second capacitor electrode 140*a* through a first contact hole C1. The contact electrode CE may be electrically connected to the drain electrode 140*e* of the third transistor T3 and the contact voltage line 120*b* through a third contact hole C3.

The light shielding film BM may be disposed over the protective film 113 and cover the gate line GL, the connection line CLr, and the first to third transistors T1 to T3. The light shielding film BM may be connected to the first to third sub-pixels SP1 to SP3 along the gate line GL.

According to an exemplary embodiment, the first spacer 400 may be disposed over a region corresponding to the third color filter 150*b*, and the second spacer 500 may be disposed over a region corresponding to the first color filter 150*r*. For example, the first spacer 400 may be disposed over a blue sub-pixel and the second spacer 500 may be disposed over a red sub-pixel.

The first spacer 400 may extend from the light shielding film BM arranged in the third sub-pixel SP3 and may contact the upper substrate 200. For example, the light shielding film BM and the first spacer 400 may be integrally formed. The first spacer 400 may maintain a distance between the lower substrate 100 and the upper substrate 200, that is, a cell gap. The cell gap may correspond to a height of the liquid crystal layer 300, and a height of a pixel electrode may be within an error range since heights of the first and second pixel electrodes PE1 and PE2 are considerably small compared to a size of the cell gap.

The light shielding film BM may have a prescribed height $h_{BM}$, and a sum of the height $h_{BM}$ of the light shielding film BM and a height $h_3$ of the first spacer 400 may be substantially the same as the size of the cell gap. The first spacer 400 may be disposed over some portion of a plurality of pixels included in the LCD. When the number of first spacers 400 is excessively large, the LCD may not be flexibly deformed by external pressure, and thus, the LCD may be broken even by small pressure. The first spacer 400 may have a circular shape in a plan view, but is not limited thereto.

The second spacer 500 may extend from the light shielding film BM arranged in the first sub-pixel SP1 and may contact the upper substrate 200. For example, the light shielding film BM and the second spacer 500 may be integrally formed. The second spacer 500 may include the lower base region 510 and the projecting region 520 projected therefrom, wherein the light shielding film BM, the lower base region 510 and the projecting region 520 may be integrally formed. For example, the first spacer 400, the lower base region 510, and the projecting region 520 of the second spacer 500 may be formed of the same material forming the light shielding film BM.

Referring to FIG. 2, the lower base region 510, in a bar shape, may be longer in a first direction than in a second direction crossing the first direction, and the longer direction may be a direction where the gate line GL extends. The projecting region 520 may project from a center region of the lower base region 510 completely surrounded by the same. The first spacer 520 may have a circular shape in a plan view, but is not limited thereto.

The first spacer 400 and the projecting region 520 of the second spacer 500 may contact the upper substrate 200, respectively. A contacting area between the first spacer 400 and the upper substrate 200 may be larger than that between the projecting region 520 and the upper substrate 200.

FIG. 3 illustrates a cross-section of FIG. 2, wherein a width L1 of the contacting area between the first spacer 400 and the upper substrate 200 may be greater than a width L2 of the contacting area between the projecting region 520 and the upper substrate 200.

According to an exemplary embodiment, a height $h_3$ of the first spacer 400 may be substantially the same as a sum of a height $h_1$ of the lower base region 510 and a height $h_2$ of the projecting region 520 in the second spacer 500, wherein the height $h_1$ of the lower base region 510 may be about two to three times a height $h_2$ of the projecting region 520.

As described above, the number of first spacers 400 may be limited, although the height thereof maintains the cell gap so that the LCD may not be broken by external impact. However, a sub-spacer having a height less than the first spacer 400 may further be arranged so that the LCD may not be excessively deformed due to external pressure.

Such a sub-spacer may not contact the upper substrate 200, and thus, may prevent deformation to a certain degree while allowing deformation of the LCD flexibly corresponding to external pressure. However, when the sub-spacer does not contact the upper substrate 200, the LCD may not return to its original state after deformation by external pressure. In particular, this situation may occur easily as the external pressure increases and dots may be generated in an image realized by the LCD due to the deformation.

However, the LCD may include the second spacer 500 including the lower base region 510 and the projecting region 520 arranged over the lower base region 510, according to an exemplary embodiment. The lower base region 510 of the second spacer 500 may prevent deformation of the LCD above a certain degree due to external pressure, wherein the projecting region 520 contacts the upper substrate 200 by projecting from the lower base region 510 and returns easily the LCD to its original state after deformation thereof.

The projecting region 520 may be smaller than the first spacer 400, and thus, may not maintain the cell gap substantially corresponding to external pressure. According to an exemplary embodiment, a region of the first spacer 400 may be about four or more times that of the projecting region 520 of the second spacer 500.

The upper substrate 200 may include an upper base substrate 210 formed of glass or plastic, and a common electrode 220 arranged over a surface of the upper base substrate 210 that faces the lower substrate 100.

Referring to FIG. 3, GLb, 130d, 140f and 150b in the third sub-pixel SP3 denote a region corresponding to the third sub-pixel region SP3 of the gate line GL, a semiconductor layer, a source electrode of the second transistor T2 arranged in the third sub-pixel region SP3, and the third color filter 150b, respectively, and wherein the third color filter 150b may be a blue color filter.

According to an exemplary embodiment, although not shown in the figure, the common electrode 220 of the LCD may be disposed over the lower substrate 100 instead of on the upper substrate 200. Furthermore, a polarizer (not shown) may be arranged inside or outside the lower substrate 100 and the upper substrate 200, respectively. In addition, an alignment layer for determining alignment directions of liquid crystals included in the liquid crystal layer 300, in a state where an electric field is not applied to the liquid crystal layer 300, may be arranged above and below the liquid crystal layer 300.

FIGS. 2 and 3 illustrate that both the first and second spacers 400 and 500 are arranged in the one pixel P, but the inventive concept is not limited thereto. Some of a plurality of pixels included in the LCD may include only one or none of the first and second spacers 400 and 500.

As described above, according to an exemplary embodiment, the LCD may include the first spacer 400 maintaining a cell gap and the second spacer 500 including the lower base region 510 and the projecting region 520, and thus, may return easily to its original state after being deformed flexibly corresponding to external pressure.

FIGS. 4A and 4B are cross-sectional views taken along lines IVa-Iva' and IVb-IVb' of FIG. 2, respectively.

Referring to FIG. 2, FIGS. 4A and 4B, the first and second sub-pixels SP1 and SP2 may be spaced apart from each other around the second data line DL2, and the second reference voltage line RL2 may extend along the second data line DL2 over the second data line DL2. For example, the second data line DL2 and second reference voltage line RL2 superimpose each other in a plan view and form a capacitor, and may increase the capacitances of the first and second liquid capacitors Clc1 and Clc2 (of FIG. 1).

The second data line DL2 and the second reference voltage line RL2 may be disposed in a peripheral region of the first pixel electrode PE1 in the upper sub-pixel region SPu and a peripheral region of the second pixel electrode PE2 in the lower sub-pixel region SP1. Furthermore, a width L3 of the second reference voltage line RL2 disposed adjacent to the first pixel electrode PE1 may be greater than a width L4 of the second reference voltage line RL2 disposed adjacent to the second pixel electrode PE2.

Similarly, the first reference voltage line RL1 may extend along the first data line DL1, and the first data line DL1 and the first reference voltage line RL1 may form a capacitor by superimposing each other in a plan view.

The first data line DL1 and the first reference voltage line RL1 may be arranged in a peripheral region of the first pixel electrode PE1 in the upper sub-pixel region SPu and a peripheral region of the second pixel electrode PE2 in the lower sub-pixel region SP1. Furthermore, a width of the first reference voltage line RL1 arranged adjacent to the first pixel electrode PE1 may be greater than a width of the first reference voltage line RL1 arranged adjacent to the second pixel electrode PE2.

The second insulating film 112 and color filters may be disposed over the second data line DL2 and the base substrate 110, wherein the first color filter 150r may be disposed over one side of the second data line DL2 and the second color filter 150g may be disposed over the other side of the second data line DL2. At least a portion of the first and second color filters 150r and 150g may be disposed over the second data line DL2, and some parts of the first and second color filters 150r and 150g may superimpose each other.

Detailed descriptions of other configurations illustrated in FIGS. 4A and 4B will not be given since they were included in the descriptions of FIGS. 2 and 3 above.

Figure 5A:
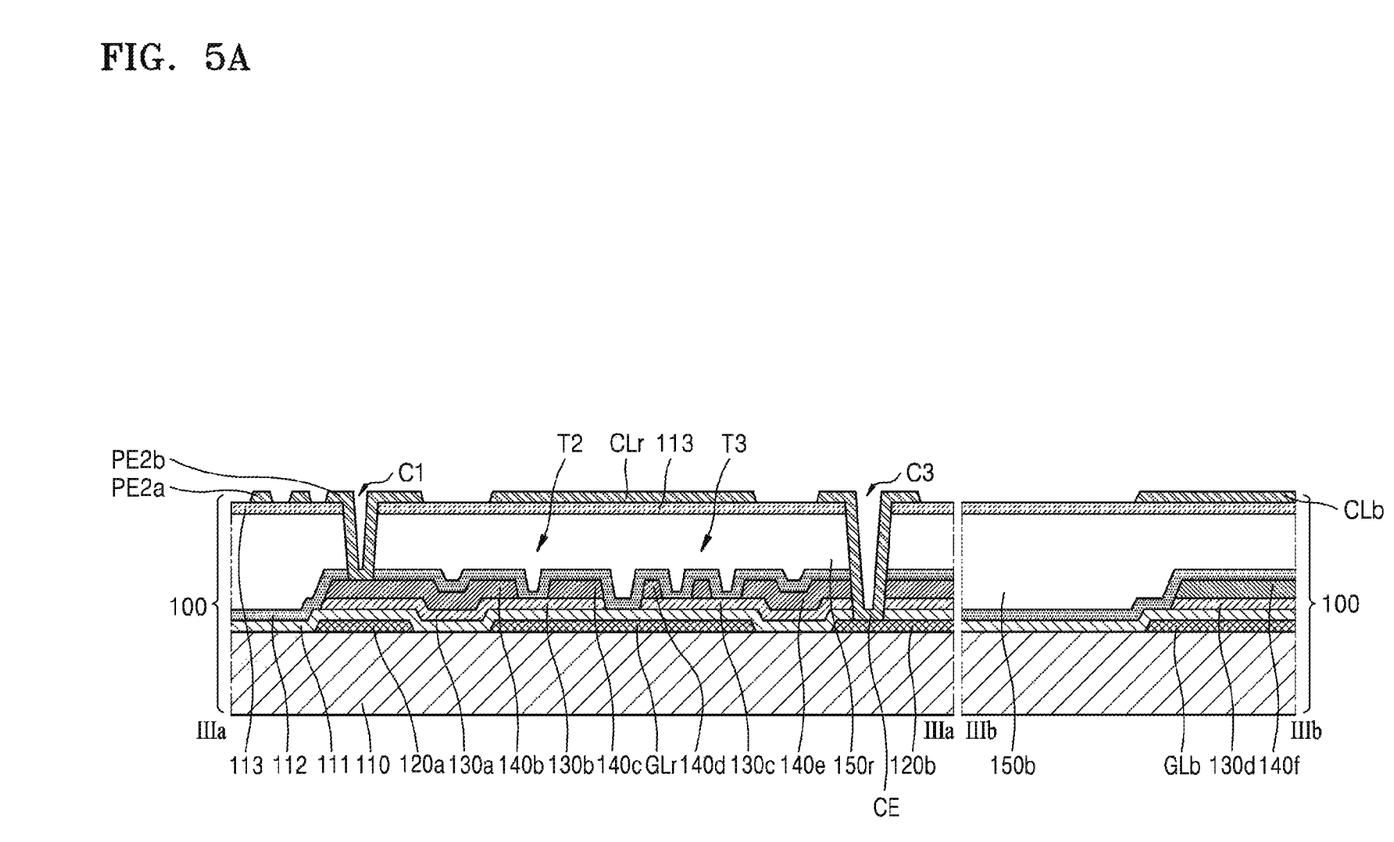
FIG. 5A, FIG. 5B, FIG. 5C, FIG. 5D, and FIG. 5E are cross-sectional views sequentially illustrating a method of manufacturing the liquid crystal display device of FIG. 3.
Figure 5B:
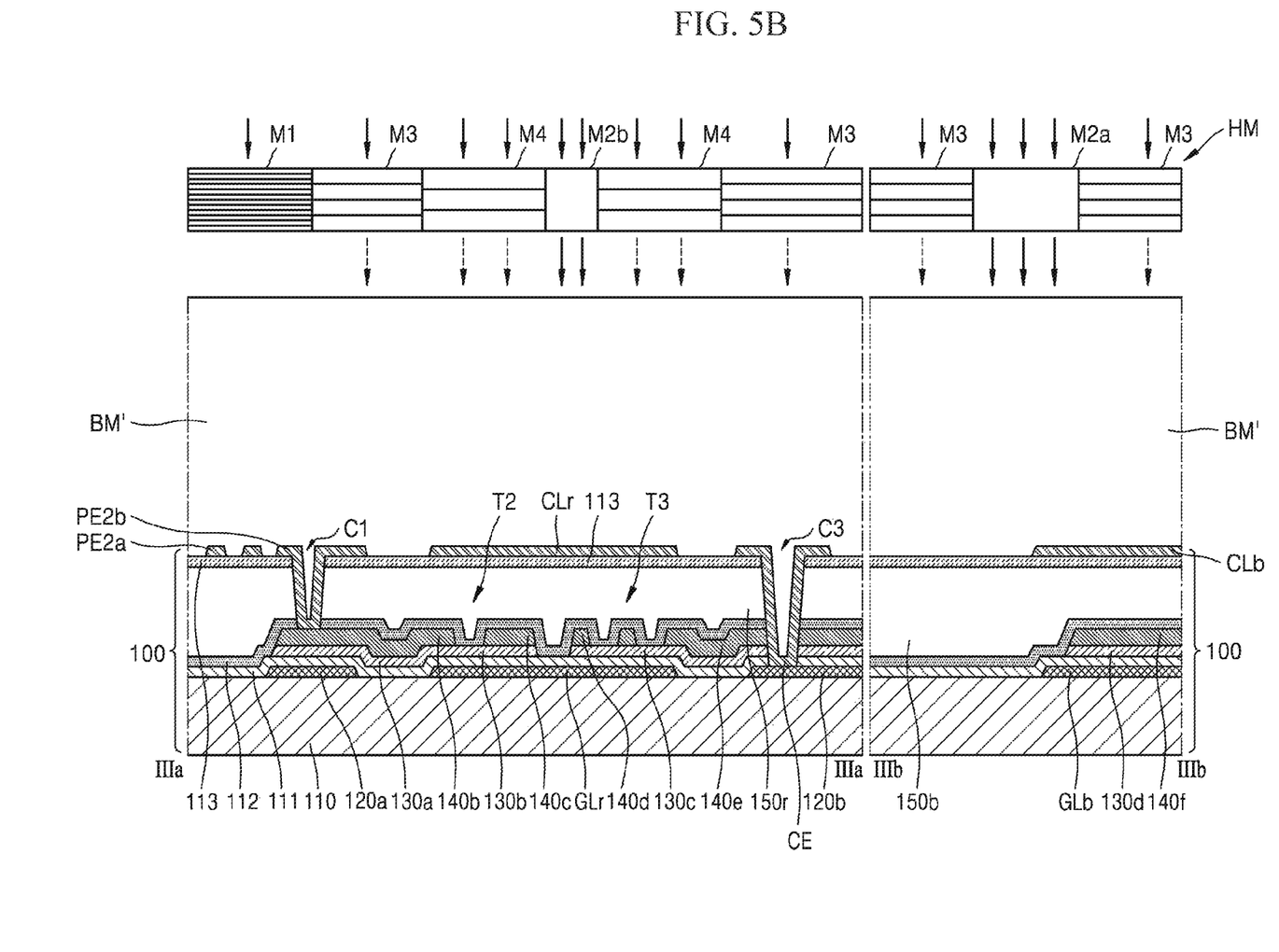
Figure 5C:
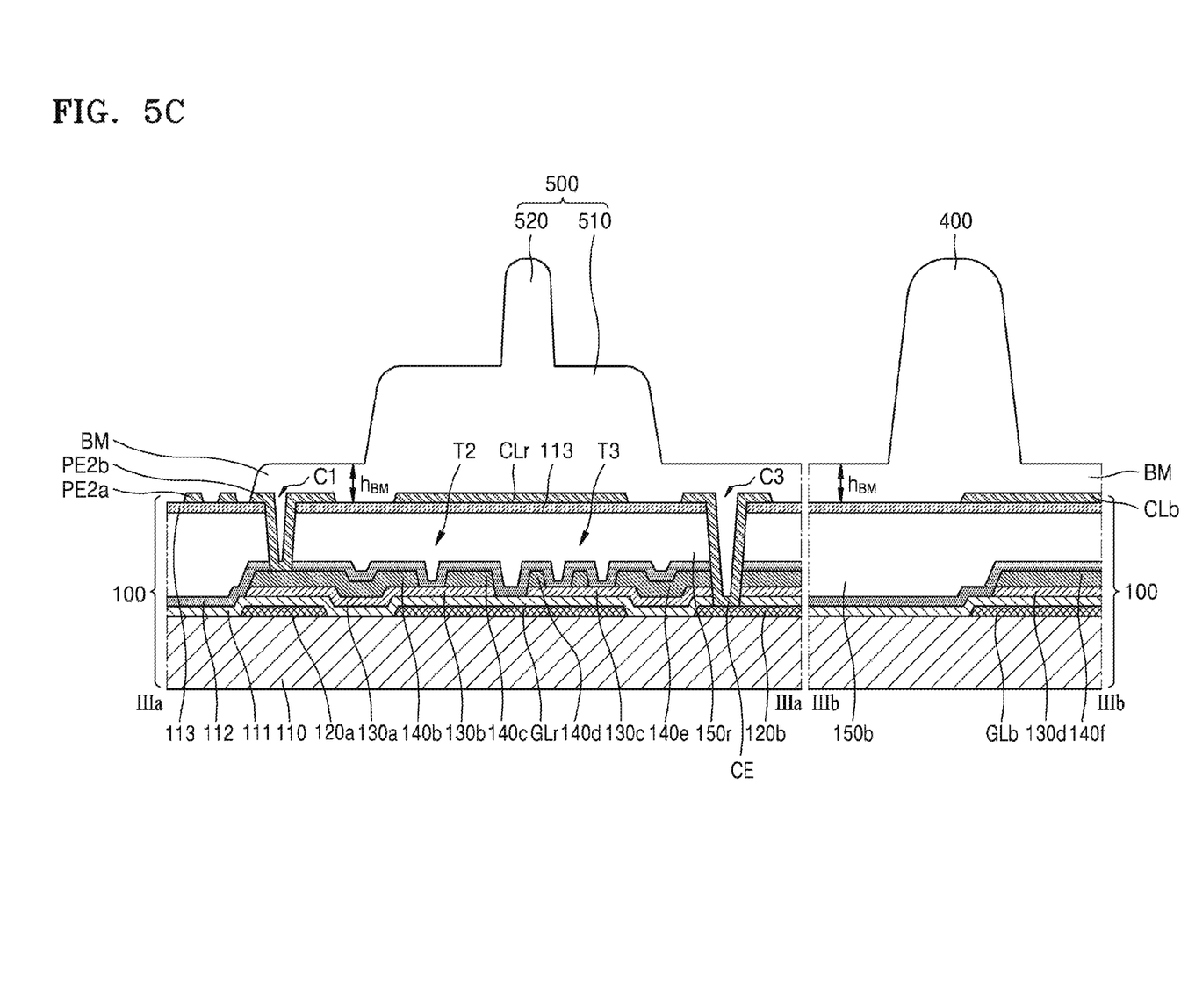
Figure 5D:
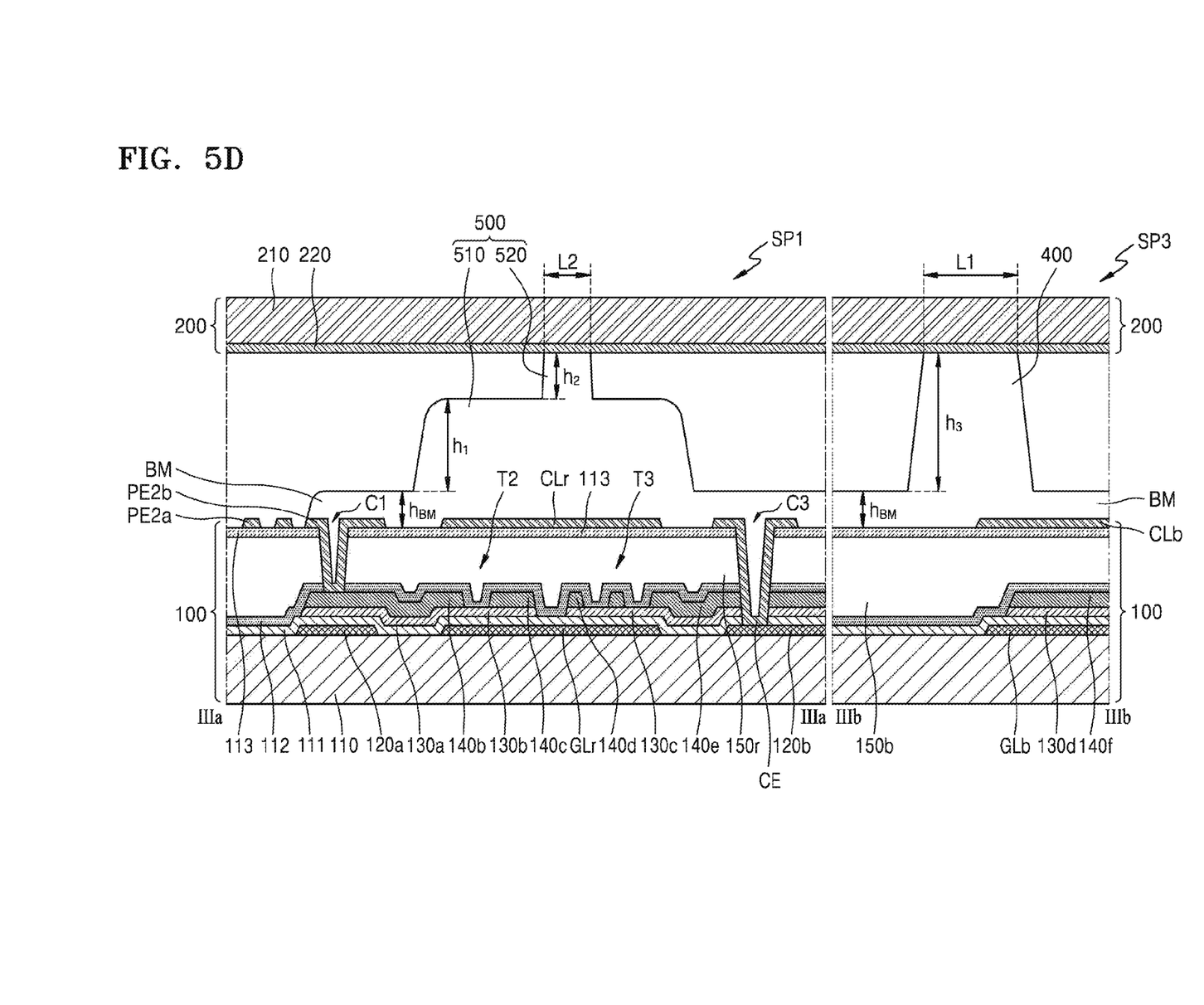
Figure 5E:
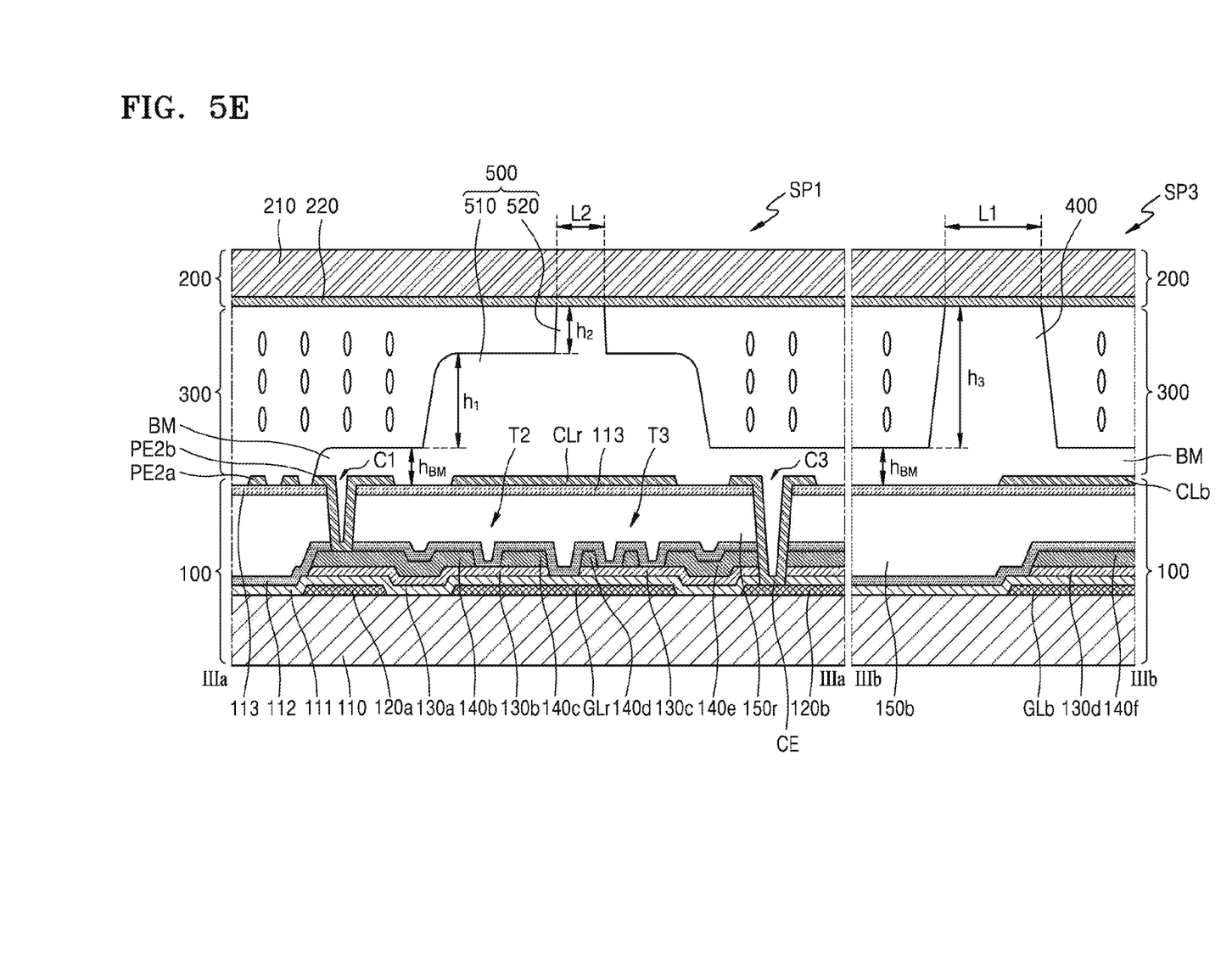
Figure 6:
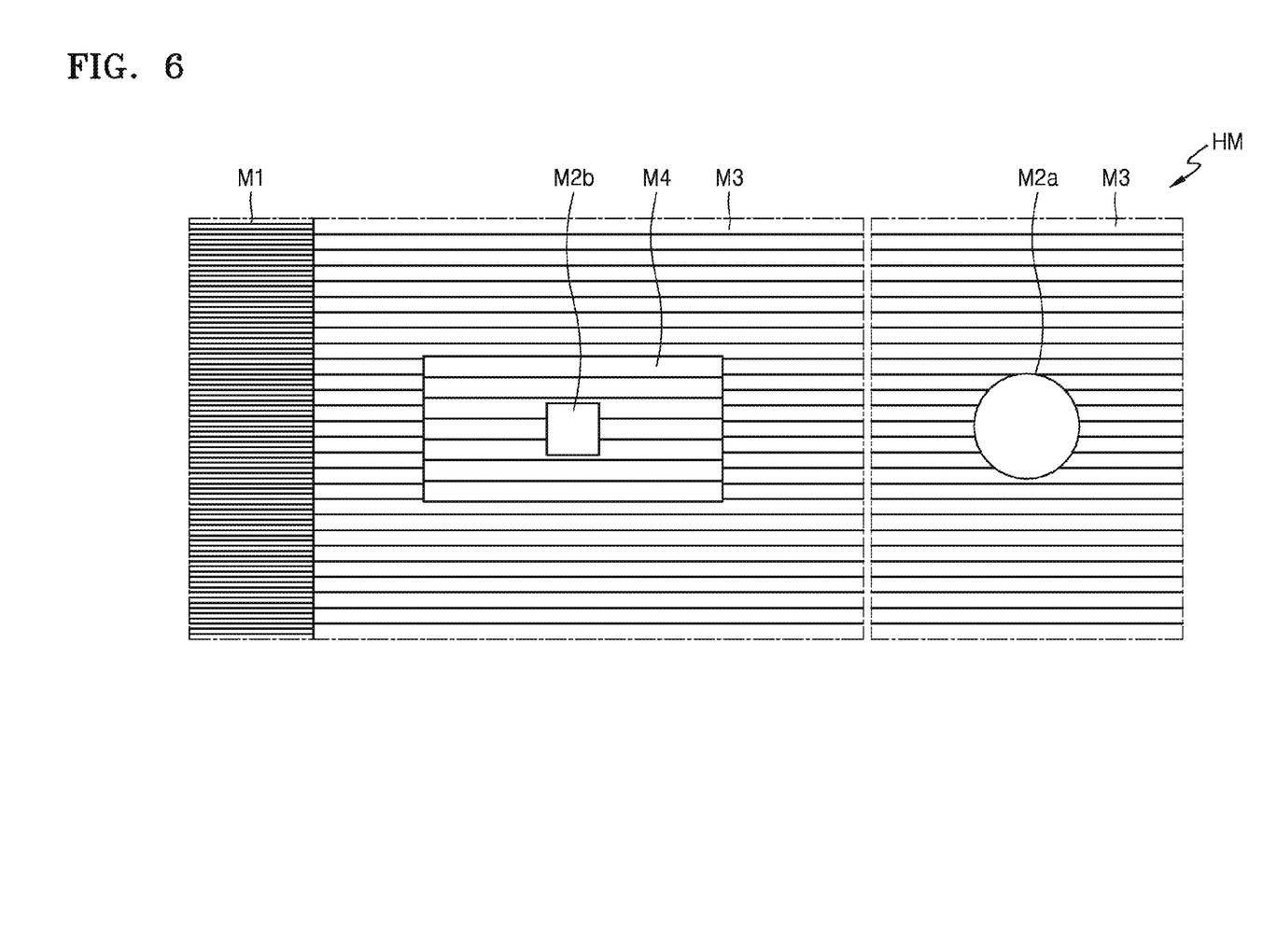
FIG. 6 is a schematic plan view illustrating a halftone mask of FIG. 5B.

FIGS. 5A through 5E are cross-sectional views sequentially illustrating a method of manufacturing the liquid crystal display device of FIG. 3, and FIG. 6 is a schematic plan view illustrating a halftone mask of FIG. 5B.

Referring to FIG. 5A, the method of manufacturing the liquid crystal display device may include an operation of providing the lower substrate 100 divided into a plurality of pixel regions, according to an exemplary embodiment. The lower substrate 100 may include the base substrate 110, the gate line GL (of FIG. 2) disposed over the base substrate 110, the first-to-fourth data lines DL1 to DL4 (of FIG. 2), the first-to-third transistors T1 to T3 (of FIG. 2), the first pixel electrode PE1 (of FIG. 2), the second pixel electrode PE2, etc.

A detailed description of the configuration of the lower substrate 100 will not be given since it was included in the description of FIG. 3 above.

Referring to FIG. 5B, FIG. 5C, and FIG. 6, a material BM' absorbing light may be formed to cover the first pixel electrode PE1 (of FIG. 2), the second pixel electrode PE2, the connection lines CLr and CLb, and the contact electrode CE over the lower substrate 100, and the material BM' may be irradiated with light by using a halftone mask HM.

The halftone mask HM may include a light shielding portion M1 blocking light, light transmissive portions M2a and M2b transmitting light, a first semi-transmissive portion M3 transmitting only some light, and a second semi-transmissive portion M4 transmitting only some light but having a higher transmittance than the first semi-transmissive portion M3.

The light absorbing material BM' may be a negative photoresist, by which a region not irradiated with light is dissolved by a developer fluid, and therefore, the light absorbing material BM' corresponding to the region, which is not irradiated with light by the light shielding portion M1, may be completely removed by the developer fluid. However, the light absorbing material BM' corresponding to any region, which is irradiated with light by the light transmissive portions M2a and M2b, may remain without being removed by the developer fluid.

The light transmissive portions M2a and M2b may include a first light transmissive region M2a corresponding to a region in which the first spacer 400 is formed, and a second light transmissive region M2b surrounded by the second semi-transmissive portion M4, wherein the second semi-transmissive portion M4 may correspond to a region in which the lower base region 510 of the second spacer 500 is formed, and the second light transmissive region M2b may correspond to a region in which the projecting region 520 of the second spacer 500 is formed.

A region corresponding to the first semi-transmissive portion M3 may correspond to a region in which the light shielding film BM is formed, wherein a transmittance of the first semi-transmissive portion M3 and the second semi-transmissive portion M4 may be about 20% or less. A height $h_{BM}$ of the light shielding film BM and the height $h_1$ of the lower base region 510 in the second spacer 500 may be determined by the transmittance. FIG. 6 illustrates a part of the halftone mask HM, wherein the first light transmissive region M2a and the second semi-transmissive portion M4 corresponding to a region in which the first spacer 400 is formed, may be completely surrounded by the first semi-transmissive portion M3 corresponding to a region, in which the light shielding film BM is formed, and the second light transmissive region M2b corresponding to the projecting region 520 may be completely surrounded by the second semi-transmissive portion M4.

The second semi-transmissive portion M4, having a bar shape, may be longer in a first direction than in a second direction crossing the first direction, and the second light transmissive region M2b corresponding to the projecting region 520 may have a square shape, a circular shape, or an octagonal shape.

Referring to FIGS. 5A-5E, the light shielding film BM, the first spacer 400, and the second spacer 500 including the lower base region 510 and the projecting region 520 may be formed by exposing and developing using the halftone mask HM.

The lower base region 510 of the second spacer 500 may correspond to a shape of the second semi-transmissive portion M4, and may have a bar shape and be longer in a first direction than in a second direction crossing the first direction. The lower base region 510 of the second spacer 500 may project from a center region of the lower base region 510 surrounded by the same.

Referring to FIG. 5D, the method of manufacturing the liquid crystal display device may include arranging the upper substrate 200 to face the lower substrate 100 and bonding the lower substrate 100 and the upper substrate 200.

The upper substrate 200 may include the upper base substrate 210 and the common electrode 220, and the height $h_3$ of the first spacer 400 may be substantially the same as the sum of the height $h_1$ of the lower base region 510 and the height $h_2$ of the projecting region 520 in the second spacer 500. The height $h_1$ of the lower base region 510 may be about two to three times a height $h_2$ of the projecting region 520.

The first and second spacers 400 and 500 may contact the upper substrate 200, respectively. Furthermore, a contacting area between the first spacer 400 and the upper substrate 200 may be larger than that between the projecting region 520 of the second spacer 500 and the upper substrate 200.

As described above, according to an exemplary embodiment, the LCD manufactured by the method of manufacturing the liquid crystal display device may include the first spacer 400 maintaining a cell gap and the second spacer 500 including the lower base region 510 and the projecting region 520, and thus, may return easily to its original state after being deformed flexibly corresponding to external pressure.

It should be understood that embodiments described herein should be considered in a descriptive sense only and not for purposes of limitation. Descriptions of features or aspects within each embodiment should typically be considered as available for other similar features or aspects in other embodiments.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device (LCD) comprising:
   a lower substrate divided into a plurality of pixel regions;
   a light shielding film disposed on the lower substrate and configured to block incident light;
   a liquid crystal layer disposed over the lower substrate;
   an upper substrate disposed over the liquid crystal layer and facing the lower substrate;
   a first spacer extending from the light shielding film and configured to maintain a cell gap between the lower substrate and the upper substrate; and
   a second spacer spaced apart from the first spacer and extending from the light shielding film, the second spacer comprising a lower base region and a projecting region disposed over the lower base region and projecting therefrom, the light shielding film being connected between the first spacer and the second spacer,
   wherein:
   a height of the first spacer is substantially the same as a sum of a height of the lower base region and a height of the projecting region in the second spacer; and
   a top surface of the lower base region of the second spacer and a side surface of the projecting region of the second spacer form a step.

2. The LCD of claim 1, wherein both of the first and second spacers contact the upper substrate, and a contacting area between the first spacer and the upper substrate is larger than a contacting area between the projecting region of the second spacer and the upper substrate.

3. The LCD of claim 1, wherein a height of the lower base region is about two to three times a height of the projecting region.

4. The LCD of claim 1, wherein:
   the lower base region of the second spacer has a bar shape and is longer in a first direction than in a second direction crossing the first direction; and
   the projecting region of the second spacer projects from a center region of the lower base region.

5. The LCD of claim 1, wherein:
   the lower substrate further comprises:
   a base substrate;
   a gate line disposed over the base substrate and extending in a first direction;
   first and second data lines disposed over the base substrate and extending in a second direction crossing the first direction;
   a first color filter disposed between the first and second data lines, and covering at least a part of the first and second data lines; and
   a protective film disposed over the first color filter;
   the light shielding film is disposed over the protective film.

6. The LCD of claim 5, further comprising:
   third and fourth data lines extending along a direction substantially parallel to the first and second data lines;
   a second color filter disposed between the second and third data lines; and a third color filter disposed between the third and fourth data lines, wherein the first, second, and third color filters comprise a red color filter, a green color filter, and a blue color filter, respectively.

7. The LCD of claim 6, wherein the first spacer is disposed over a region corresponding to the third color filter, and the second spacer is disposed over a region corresponding to the first color filter.

8. The LCD of claim 5, further comprising:

a pixel electrode disposed over the first color filter and comprising first and second pixel electrodes spaced apart from each other and between which the gate line is interposed;

a first transistor connected to the first pixel electrode; and a second transistor connected to the second pixel electrode;

wherein the light shielding film extends along the gate line to cover the first and second transistors.

9. The LCD of claim 8, further comprising a first reference voltage line and a second reference voltage line extending along and facing the first and second data lines, respectively, wherein the first and second reference voltage lines are disposed over a same layer on which first and second pixel electrodes are also disposed.

10. The LCD of claim 7, wherein widths of the first and second reference voltage lines disposed adjacent to the first pixel electrode are greater than widths of the first and second reference voltage lines disposed adjacent to the second pixel electrode.

11. The LCD of claim 7, further comprising a connection line connecting the first and second reference voltage lines and extending along a direction substantially parallel to the gate line.

12. A method of manufacturing a liquid crystal display device (LCD), comprising:

forming a first spacer and a second spacer spaced apart from the first spacer over a lower substrate divided into a plurality of pixel regions, the second spacer comprising a lower base region and a projecting region over the lower base region and projecting therefrom;

forming a light shielding film on the lower substrate, the light shielding film being configured to block incident light;

arranging the upper substrate to face the lower substrate and bonding the lower substrate to the upper substrate; and forming a liquid crystal layer by injecting a liquid crystal between the upper substrate and the lower substrate, wherein:

the first spacer and the second spacer extend from the light shielding film;

the light shielding film is connected between the first spacer and the second spacer;

a height of the first spacer is substantially the same as a sum of a height of the lower base region and a height of the projecting region in the second spacer; and a top surface of the lower base region of the second spacer and a side surface of the projecting region of the second spacer form a step.

13. The method of claim 12, wherein the light shielding film and the first and second spacers are formed through a single mask process using a halftone mask, the halftone mask comprising a light transmissive portion transmitting light, a light shielding portion blocking light, a first semi-transmissive portion transmitting only some light, and a second semi-transmissive portion transmitting only some light but having a higher transmittance than the first semi-transmissive portion.

14. The method of claim 13, wherein the light transmissive portion comprises:

a first region corresponding to a region in which the first spacer is formed; and a second region corresponding to a region in which the projecting region of the second spacer is formed and surrounded by the second semi-transmissive portion.

15. The method of claim 14, wherein:

the first semi-transmissive portion is corresponds to a region in which the light shielding film is formed; and the second semi-transmissive portion corresponds to a region in which the lower base region of the second spacer is formed; and a transmittance of the first and the second semi-transmissive portions is less than or equal to about 20%.

16. The method of claim 14, wherein:

the lower base region of the second spacer has a bar shape and is longer in a first direction than in a second direction crossing the first direction; and the projecting region of the second spacer projects from a center region of the lower base region.

17. The method of claim 12, wherein:

the first and second spacers contact the upper substrate; and a contacting area between the first spacer and the upper substrate is larger than that between the projecting region of the second spacer and the upper substrate.

18. The method of claim 12, wherein a height of the lower base region is about two to three times a height of the projecting region.

19. The LCD of claim 1, wherein the upper surface of the lower base region of the second spacer is parallel to the upper substrate except for a portion from which the projecting region projects.

20. The method of claim 12, wherein the upper surface of the lower base region of the second spacer is parallel to the upper substrate except for a portion from which the projecting region projects.

* * * * *